(12) United States Patent
Merrill

(10) Patent No.: US 10,115,282 B1
(45) Date of Patent: Oct. 30, 2018

(54) BABY CAR SEAT AND DOCK ALARM SYSTEM

(71) Applicant: Joseph Merrill, Lake Havasu City, AZ (US)

(72) Inventor: Joseph Merrill, Lake Havasu City, AZ (US)

( * ) Notice: Subject to any disclaimer, the term of this patent is extended or adjusted under 35 U.S.C. 154(b) by 0 days.

(21) Appl. No.: 15/785,542

(22) Filed: Oct. 17, 2017

(51) Int. Cl.
*B60N 2/26* (2006.01)
*G08B 21/02* (2006.01)
*B60N 2/28* (2006.01)
*B60C 9/00* (2006.01)

(52) U.S. Cl.
CPC ............ *G08B 21/0205* (2013.01); *B60C 9/00* (2013.01); *B60N 2/2821* (2013.01); *G08B 21/0269* (2013.01); *G08B 21/0283* (2013.01)

(58) Field of Classification Search
CPC .... G08B 21/22; G08B 21/24; G08B 21/0205; B60N 2/002; B60N 2/26; B60N 2/28; B60N 2/2806; B60N 2/2812; B60N 2/2842; B60R 21/015; B60R 21/01516; B60R 21/01546; B60R 21/01556
USPC ......... 340/573.1, 457, 457.1, 665, 666, 667, 340/573.4
See application file for complete search history.

(56) References Cited

U.S. PATENT DOCUMENTS

| | | | |
|---|---|---|---|
| 5,581,234 A * | 12/1996 | Emery et al. | 340/457.1 |
| 5,949,340 A * | 9/1999 | Rossi | 340/457 |
| 6,357,091 B1 | 3/2002 | Devereaux | |
| 6,924,742 B2 | 8/2005 | Mesina | |
| 6,998,988 B1 | 2/2006 | Kalce | |
| 7,224,270 B2 * | 5/2007 | Patterson et al. | 340/457.1 |
| 7,378,979 B2 | 5/2008 | Rams, Jr. | |
| D637,825 S | 5/2011 | Xu | |
| 8,058,983 B1 * | 11/2011 | Davisson et al. | 340/457 |
| 8,125,343 B2 | 2/2012 | Denale | |
| 8,217,796 B2 * | 7/2012 | Trummer | 340/457.1 |
| 2007/0126566 A1 * | 6/2007 | Griffin et al. | 340/457 |
| 2007/0296254 A1 * | 12/2007 | Kahn | 340/667 |
| 2008/0164990 A1 * | 7/2008 | Anderson | 340/457 |
| 2008/0258516 A1 * | 10/2008 | Meeker et al. | 297/183.1 |
| 2009/0040036 A1 | 2/2009 | Talis | |
| 2009/0234542 A1 * | 9/2009 | Orlewski | 701/45 |
| 2010/0253504 A1 * | 10/2010 | Lliteras et al. | 340/539.11 |
| 2010/0283596 A1 * | 11/2010 | White | 340/457.1 |
| 2014/0253313 A1 * | 9/2014 | Schoenberg | 340/457 |
| 2014/0253314 A1 * | 9/2014 | Rambadt et al. | 340/457.1 |
| 2017/0282822 A1 * | 10/2017 | Hunter | B60R 16/037 340/457 |

* cited by examiner

Primary Examiner — Hung T Nguyen

(57) ABSTRACT

The baby car seat and dock alarm system comprises a car seat, docking base, and a docking alarm system. The docking alarm system comprises sensors and a control module. The control module monitors the sensors and detects when an alarm condition exists. The control module communicates with vehicle subsystems and with the driver's smart phone using two transceivers in the control unit. When the control unit detects an alarm condition it may attempt to notify the driver and/or bystanders and it may attempt to remedy the situation. As a non-limiting example, if the control module detects that a child has been left in a hot, unattended vehicle, it may notify the driver via a text message, notify bystanders by sounding the vehicle horn, and remedy the situation by lowering the vehicle's windows.

11 Claims, 4 Drawing Sheets

BABY CAR SEAT AND DOCK ALARM SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of child car safety seats, more specifically, a baby car seat and dock alarm system.

SUMMARY OF INVENTION

The baby car seat and dock alarm system comprises a car seat, docking base, and a docking alarm system. The docking alarm system comprises sensors and a control module. The control module monitors the sensors and detects when an alarm condition exists. The control module communicates with vehicle subsystems and with the driver's smart phone using two transceivers in the control unit. When the control unit detects an alarm condition it may attempt to notify the driver and/or bystanders and it may attempt to remedy the situation. As a non-limiting example, if the control module detects that a child has been left in a hot, unattended vehicle, it may notify the driver via a text message, notify bystanders by sounding the vehicle horn, and remedy the situation by lowering the vehicle's windows.

An object of the invention is to provide a car safety seat for a child that comprises a docking alarm system.

Another object of the invention is to provide a car seat that comprises sensors in the seat to detect the weight of the seat occupant, latching of the harness, and docking of the car seat with a docking base.

A further object of the invention is to provide a car seat that communicates with a vehicle computer system and with the driver's smart phone.

Yet another object of the invention is to provide a car seat that detects an alarm condition, attempts to notify individuals regarding the alarm condition and/or attempts to remedy the alarm condition.

These together with additional objects, features and advantages of the baby car seat and dock alarm system will be readily apparent to those of ordinary skill in the art upon reading the following detailed description of the presently preferred, but nonetheless illustrative, embodiments when taken in conjunction with the accompanying drawings.

In this respect, before explaining the current embodiments of the baby car seat and dock alarm system in detail, it is to be understood that the baby car seat and dock alarm system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the baby car seat and dock alarm system.

It is therefore important that the claims be regarded as including such equivalent construction insofar as they do not depart from the spirit and scope of the baby car seat and dock alarm system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
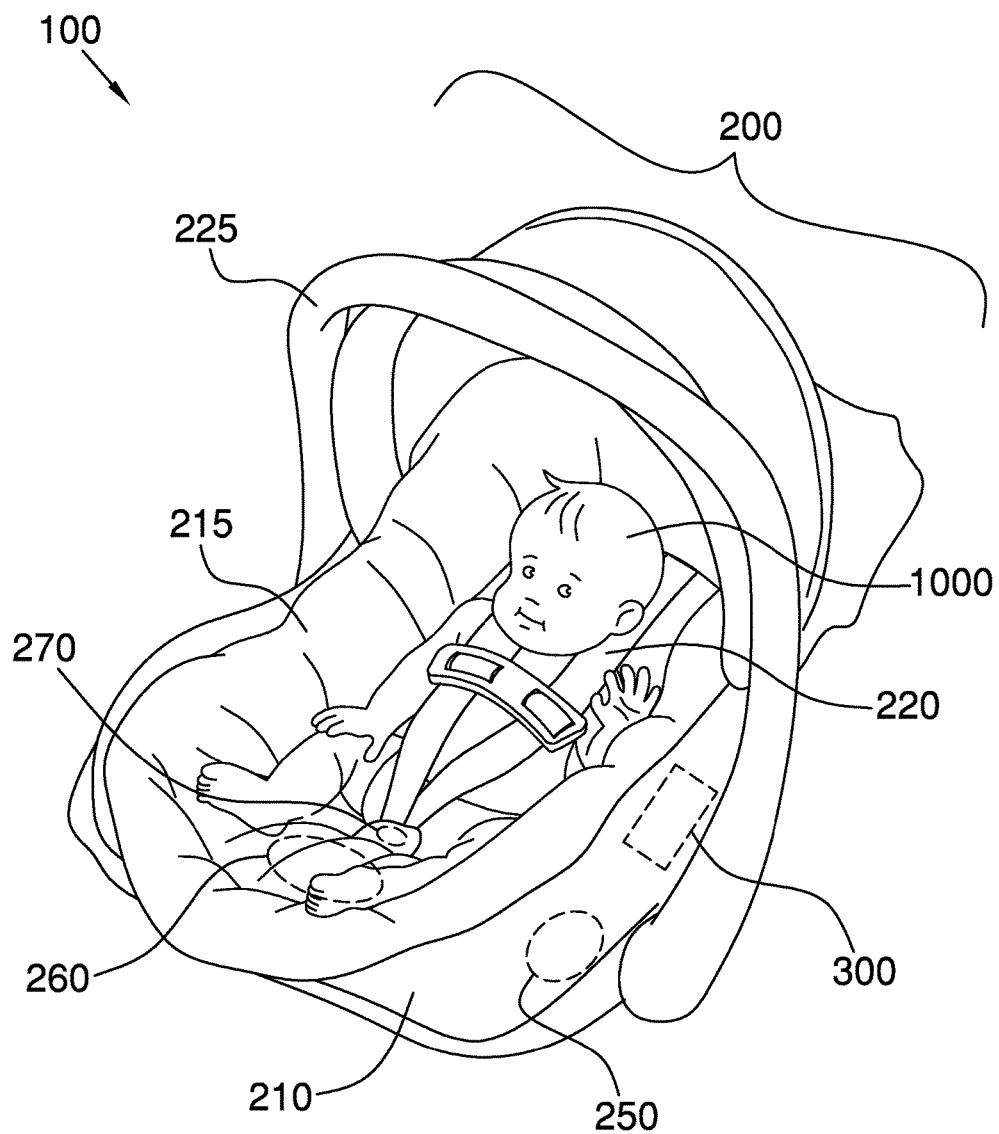
FIG. 1 is a perspective view of an embodiment of the disclosure.
Figure 2:
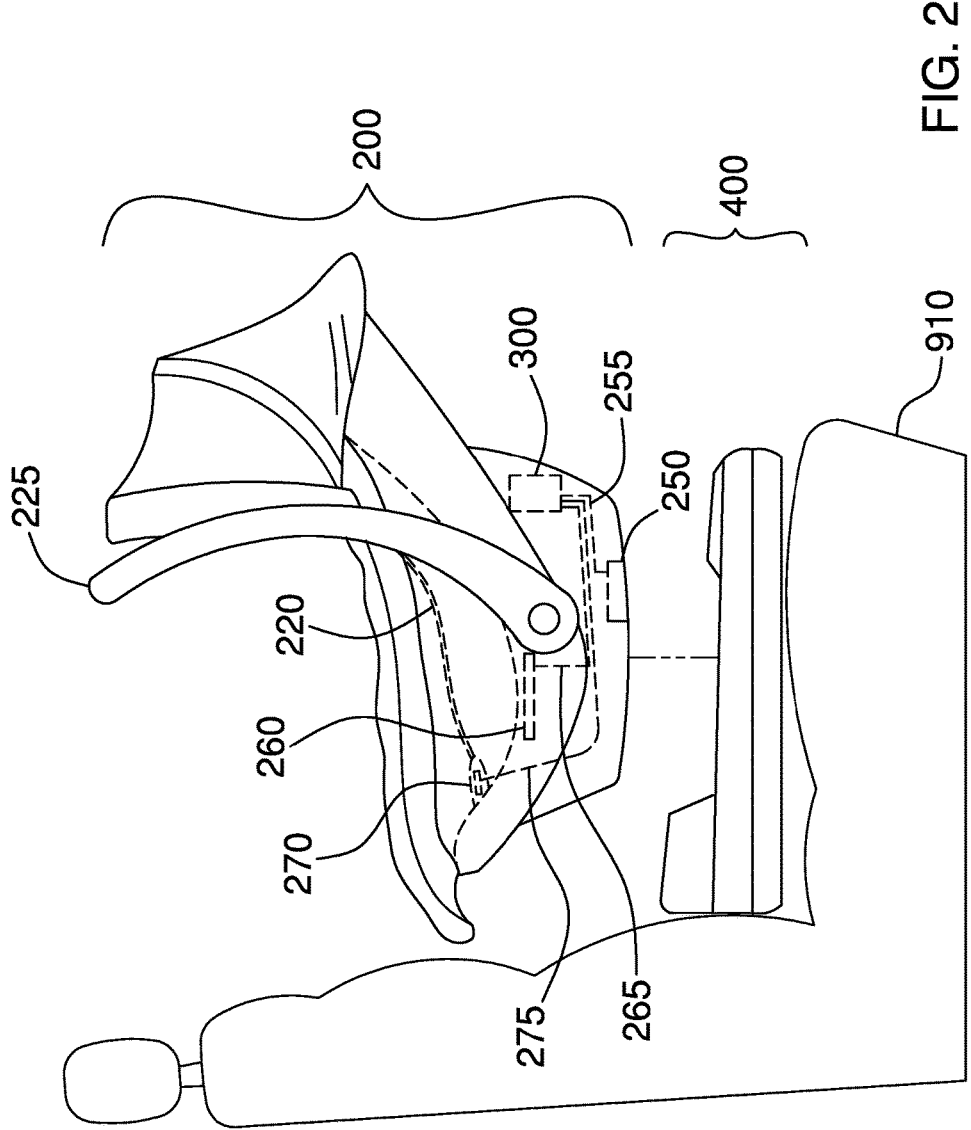
FIG. 2 is a side view of an embodiment of the disclosure.
Figure 3:
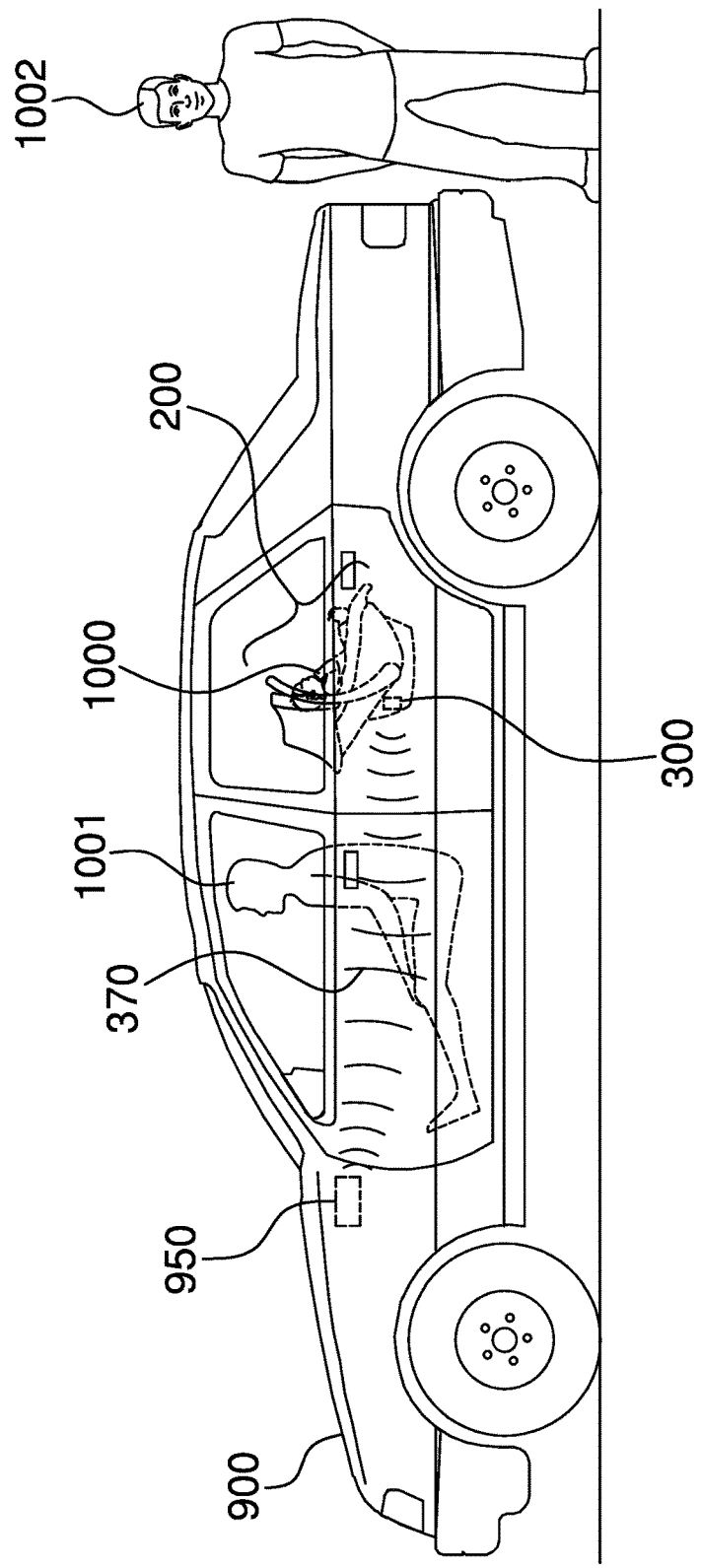
FIG. 3 is an in-use view of an embodiment of the disclosure.
Figure 4:
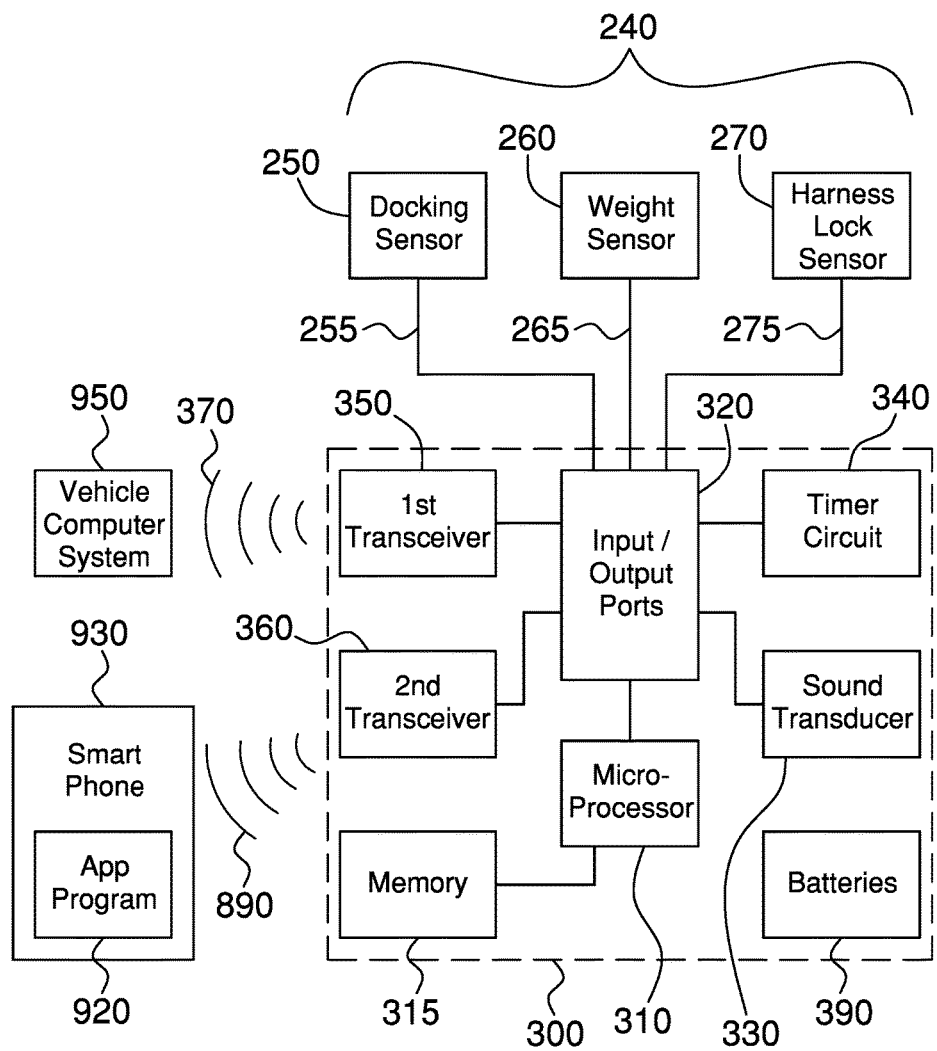
FIG. 4 is a block diagram of an embodiment of the disclosure focusing on the control module functions.

Detailed reference will now be made to a first potential embodiment of the disclosure, which is illustrated in FIGS. 1 through 4.

The baby car seat and dock alarm system 100 (hereinafter invention) comprises a car seat 200, a docking base 400, and a docking alarm system 240. Responsive to the invention 100 determining that a child 1000 may have been left unattended in the car seat 200 while the car seat 200 is still inside of a vehicle 900, the invention 100 attempts to notify the driver 1001 and applicable bystander 1001.

The car seat 200 may be a portable seat for a child that attaches to a vehicle seat and is specifically designed to protect the child from injury or death during a collision. The car seat 200 comprises a hard shell 210 lined with padding 215 and a restraint harness 220. The car seat 200 may comprise a carrying handle 225 and a position adjustment mechanism (not illustrated in the figures). The use of car seats to protect children in vehicles is well known in the art.

The docking base 400 may be a platform that rests on a vehicle seat 910 and provides increased stability to the car seat 200 when the car seat 200 is latched into the docking base 400. The docking base 400 may latch directly to the vehicle seat 910 and the car seat 200 may lock into the docking base 400 during vehicular travel. The car seat 200 may detach from the docking base 400 to be carried manually upon reaching a destination.

The docking alarm system 240 comprises a weight sensor 260, a harness lock sensor 270, a docking sensor 250, and a control module 300. The docking alarm system 240 may be mounted to the interior of the car seat 200. The docking alarm system 240 communicates with a vehicle computer system 950 to monitor and control certain functions of the vehicle 900. The docking alarm system 240 monitors the docking sensor 250, the weight sensor 260, the harness lock sensor 270, and the status of the vehicle 900 to determine whether an alarm condition exists. If the docking alarm system 240 determines that the alarm condition exists, the docking alarm system 240 may attempt to notify the driver and/or to remedy the alarm condition.

The weight sensor 260 may provide a weight signal 265 to a microprocessor 310 located in the control module 300. The weight signal 265 may be indicative of the weight of the child occupying the car seat 200. In some embodiments, the weight signal 265 may indicate that a weight above a predefined threshold is present in the car seat 200. Based upon the weight signal 265 that it receives, the microprocessor 310 may be able to determine if the child is present in the car seat 200 or not.

The harness lock sensor 270 may provide a harness lock signal 275 to the microprocessor 310 located in the control module 300. The harness lock signal 275 may be indicative of a proper closing of the restraint harness 220. Based upon the harness lock signal 275 that it receives, the microprocessor 310 may be able to determine that the restraint harness 220 is closed and locked or that the restraint harness 220 has been opened.

The docking sensor 250 may provide a docking signal 255 to the microprocessor 310. The docking signal 255 may be indicative of the docking status of the car seat 200. The microprocessor 310 may use this status to determine if the car seat 200 is latched into the docking base 400. Based upon this information, the microprocessor 310 may decide whether one or more notification actions and/or one or more remediation actions should be modified or whether they should be invoked at all. As a non-limiting example, if the docking sensor 250 indicates that the car seat 200 is not docked to the docking base 400, then the car seat 200 may no longer be inside of the vehicle 900 and attempts to control subsystems of the vehicle 900 can be expected to fail. Furthermore, if the car seat 200 is improperly docked while the car is in motion that may be reason enough to give rise to the alarm condition.

The control module 300 comprises the microprocessor 310, memory 315, input/output ports 320, a sound transducer 330, a first transceiver 350, a second transceiver 360, and one or more batteries 390. The control module 300 continuously monitors input signals from sensors and communication devices, detects changes in the state of the car seat 200 or the vehicle 900, and determines whether or not the alarm condition exists. In response to a determination that the alarm condition exists, the control module 300 may vary output signals or activate communication devices to remedy the alarm condition.

The microprocessor 310 may be an industry standard processor suitable for use in a battery-operated device and capable of executing a control program stored in the memory 315. The control program may determine the specific sequence of operations that the control module 300 performs including, but not limited to, when and how often to monitor input signals, how to determine that the alarm condition exists, and what specific responses to invoke when the alarm condition exists. The memory 315 may be non-volatile memory, volatile memory, or a combination thereof. The memory 315 may hold the control program and/or data used by the control program. The input/output ports 320 are digital interfaces between the microprocessor 310 and peripheral devices. As a non-limiting example, peripheral devices may include sensors such as the weight sensor 260 and the harness lock sensor 270, the sound transducer 330, and communication devices such as the first transceiver 350 and the second transceiver 360. The sound transducer 330 may be a device that produces an audible sound when activated by an electrical signal. The sound transducer 330 may be capable of producing one or more monotonic notes or it may reproduce a complex sound such as human speech that is encoded in the activation signal.

The control module 300 may further comprise a timer circuit 340. The timer circuit 340 may allow the microprocessor 310 to measure the passage of time so that the duration of a specific input signal or output signal may be determined.

The first transceiver 350 may be a device capable of exchanging wireless signals 370 with the vehicle computer system 950. The first transceiver 350 may be selected to match frequency, modulation technique, protocol, and other communication parameters of the vehicle computer system 950, thus allowing the car seat 200 to communicate with the vehicle 900. Communication between the control module 300 and the vehicle computer system 950 via the first transceiver 350 may allow the control module 300 to monitor and control subsystems within the vehicle 900. As a non-limiting example, messages exchanged via the first transceiver 350 may allow the control module 300 to determine whether or not the engine is running, the door lock status, the window up/down status, and the vehicle internal temperature. As a non-limiting example, the first transceiver 350 may allow the control module 300 to start the engine, turn on the air conditioner, lower the windows, and sound the horn. Messages sent from the control module 300 to the vehicle computer system 950 via the first transceiver 350 might also allow the control module 300 to play audio through the sound system of the vehicle 900.

The second transceiver 360 may be a device capable of exchanging signals with a smart phone 930 via a cellular telephone network 890. Using the second transceiver 360, the control module 300 may be able to send a text message to the smart phone 930, place a call to the smart phone 930 and play audio through the connection, or digitally communicate with an application program 920 running on the smart phone 930.

In some embodiments, the first transceiver 350 and the second transceiver 360 may be a single transceiver.

The one or more batteries 390 may provide electrical energy to power the control module 300. When the one or more batteries 390 are depleted, they may be replaced or recharged. In some embodiments, the one or more batteries 390 may be recharged by plugging a recharging cord (not illustrated in the figures) into a cigarette lighter (not illustrated in the figures).

The alarm condition is a situation that the driver needs to be aware of. The alarm condition may be detected by analyzing the state of the weight sensor 260, the state of the harness lock sensor 270, the state of the docking sensor 250, and information acquired from the vehicle computer system 950. Several different situations may give rise to the alarm condition and the specific response actions taken by the control module 300 may vary based upon the details of the alarm condition.

As a non-limiting example, one situation that may give rise to the alarm condition is that a child has been left in the car seat 200 of the vehicle 900 when the vehicle 900 has been parked. This may be known as the 'CHILD LEFT IN VEHICLE' condition. The microprocessor 310 in the control module 300 may determine that the child occupies the car seat 200 by detecting, via the weight sensor 260, that an object heavy enough to be the child is in the car seat 200, by detecting, via the harness lock sensor 270, that the restraint harness 220 is closed and locked, or by a combination of the two. The microprocessor 310 may determine that the vehicle 900 is parked by detecting, via information obtained from the vehicle computer system 950, that the engine is not running, by detecting that the engine is not running and that the vehicle doors are locked, or by detecting some other combination of vehicle subsystem states.

In some embodiments, the microprocessor 310 may also consider the passage of time into the determination that the alarm condition exists. As a non-limiting example, the microprocessor 310 may determine that the child occupies the car seat 200 and that the engine is not running and may then allow the passage of a predetermined amount of time, such as 15 seconds, before taking action responsive to the alarm condition. This may allow time for the driver to remove the child from the car seat 200 before sounding the horn.

As a further non-limiting example, another situation that may give rise to the alarm condition is that the vehicle 900 is being driven while the child is improperly restrained. This may be known as the 'DRIVING WITH UNRESTRAINED CHILD' condition. The microprocessor 310 may determine that the child occupies the car seat 200 by detecting, via the weight sensor 260, that an object heavy enough to be the child is in the car seat 200, by detecting, via the harness lock sensor 270, that the restraint harness 220 is closed and locked, or by a combination of the two. The microprocessor 310 may determine that the vehicle 900 is in motion by detecting, via information obtained from the vehicle computer system 950, that the engine is running, that the transmission is in a forward or reverse gear, and that the speed of the vehicle is not zero.

As another non-limiting example, the microprocessor 310 may detect, using circuitry within the control module 300, that the one or more batteries 390 within the car seat 200 are low and need to be recharged. This may be known as the 'LOW BATTERY' condition. By way of example and not of limitation, the microprocessor 310 may detect that the one or more batteries 390 are low by comparing the voltage produced by the one or more batteries 390 against a predefined threshold voltage. This situation is important to detect and correct because if the one or more batteries 390 become totally depleted then the protective features of the invention 100 that are described herein may no longer function.

The microprocessor 310 of the control module 300 may direct a response to the specific situation that gave rise to the alarm condition by changing the vehicle subsystem states via the first transceiver 350, by communicating with the smart phone 930 or with the application program 920 running on the smart phone 930 via the second transceiver 360, or by activating the sound transducer 330 within the car seat 200.

In response to the alarm condition, the microprocessor 310 may perform the one or more notification actions and/or the one or more remediation actions. As a non-limiting example, in response to the 'CHILD LEFT IN VEHICLE' condition, the one or more notification actions may include: sounding the horn of the vehicle 900, activating the sound transducer 330 within the car seat 200, sending a text message to the smart phone 930 at a pre-designated phone number, placing a phone call to a pre-designated number and playing a recorded message followed by a live audio feed from within the vehicle 900, or sending an alert message to the application program 920 running on the smart phone 930. The actions may be repeated to using a list of pre-designated phone numbers. As a non-limiting example, the text message and the alert message may be sent to multiple smart phones.

In some embodiments, the control module 300 may be able to acquire the geographic position of the vehicle 900 from the vehicle computer system 950. In these embodiments, the one or more notification actions may include the geographic position of the vehicle 900.

The one or more remediation actions may include: lowering or raising the windows, unlocking or locking the vehicle doors, starting the engine, and running the air conditioner. As a non-limiting example, a specific remedy might be to raise the windows, lock the vehicle doors, start the engine, and run the A/C until the driver returns to the vehicle 900 to remove the child.

In some embodiments, certain ones of the one or more remediation actions may require approval in the form of a message sent by the application program 920 running on the smart phone 930 of the driver. As a non-limiting example, the decision to start the engine and run the A/C may require that the driver approve the action using the application program 920.

The one or more notification actions and the one or more remediation actions may each have an alternative action defined. As a non-limiting example, if an attempt to raise the windows, lock the vehicle doors, start the engine, and run the A/C until the driver returns to the vehicle 900 fails because the control module 300 senses that the engine will not start, the alternative action may be to lower the windows and stop the engine.

As a further non-limiting example, in response to the 'DRIVING WITH UNRESTRAINED CHILD' condition, the one or more notification actions may include: activating the sound transducer 330 within the car seat 200 or playing a prerecorded audio message through the sound system of the vehicle 900. In this case, the one or more remediation actions may include raising the windows and locking the vehicle doors.

As a further non-limiting example, in response to the 'LOW BATTERY' condition, the one or more notification actions may include: activating the sound transducer 330 within the car seat 200 or playing a prerecorded audio message through the sound system of the vehicle 900 and the one or more remediation actions may be omitted.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "application" or "app" is software that is specifically designed for use with a personal computing device.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may be construed to mean recharging or replacing individual cells, individual batteries of cells, or a package of multiple battery cells as is appropriate for any given battery technology that may be used.

As used herein, the word "child" is intended to include anyone who might ride in a car safety seat and specifically includes newborns, infants, toddlers, and small children.

As used in this disclosure, a "cord" is a flexible piece of string, line, rope, or wire that is at least several times its diameter in length. Cords may be made from threads, yarns, piles, or strands of material that are braided or twisted together, from a monofilament (such as fishing line), or from one or more wires. Cords have tensile strength but are too flexible to provide compressive strength and are not suitable for use in pushing objects. String, line, cable, and rope are synonyms for cord.

As used in this disclosure, an "engine" is a device with moving parts that is used to convert energy into rotational or linear motion.

As used in this disclosure, a "handle" is an object by which a tool, object, or door is held or manipulated with the hand.

As used in this disclosure, a "harness" is an apparatus comprising a plurality of straps and one or more fasteners that is used to fasten or anchor a first person or first object to a second object. The phrase "N point harness" refers to the installation of the harness wherein the harness has N anchor points. As a non-limiting example, a 2 point harness has two anchor points while a 5 point harness has 5 anchor points.

As used in this disclosure, the word "interior" is used as a relational term that implies that an object is located or contained within the boundary of a structure or a space.

As used in this disclosure, a "latch" is a fastening or locking mechanism. The use of the term latch may imply the insertion of an object into a notch or cavity.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, a "sensor" is a device that receives and responds in a predetermined way to a signal or stimulus.

As used in this disclosure, a "shell" is a structure that forms an outer covering intended to contain an object. Shells are often, but not necessarily always, rigid or semi-rigid structures that are intended to protect the object contained within it. Some shells may only partially cover the exterior surface of the object.

As used in this disclosure, a "transceiver" is a device that is used to transmit and/or receive signals. The signals may be audible, optical, or RF in nature.

As used in this disclosure, a "transducer" is a device that converts a physical quantity, such as pressure or brightness into an electrical signal or a device that converts an electrical signal into a physical quantity.

As used in this disclosure, a "vehicle" is a device that is used for transporting passengers, goods, or equipment.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A baby car seat and dock alarm system comprising:

a car seat, a docking base, and a docking alarm system;

wherein responsive to the baby car seat and dock alarm system determining that a child has been left unattended in the car seat while the car seat is still inside of a vehicle, the baby car seat and dock alarm system is adapted to notify a driver of said vehicle and bystanders;

wherein the car seat is a portable seat that is adapted for use by the child and that attaches to a vehicle seat and is adapted to protect the child from injury or death during a collision of said vehicle;

wherein the car seat comprises a hard shell lined with padding, a restraint harness, and a carrying handle;

wherein the docking base is a platform that rests on the vehicle seat and provides increased stability to the car seat when the car seat is latched into the docking base;

wherein the docking base latches directly to the vehicle seat;

wherein the car seat locks into the docking base during vehicular travel and detaches from the docking base to be carried manually upon reaching a destination;

wherein the docking alarm system comprises a weight sensor, a harness lock sensor, a docking sensor, and a control module;

wherein the docking alarm system is mounted to the interior of the car seat;

wherein the docking alarm system communicates with a vehicle computer system to monitor and control functions of the vehicle;

wherein the docking alarm system monitors the docking sensor, the weight sensor, the harness lock sensor, and the vehicle to determine whether an alarm condition exists;

wherein if the docking alarm system determines that the alarm condition exists, the docking alarm system is adapted to notify the driver and/or to remedy the alarm condition;

wherein the weight sensor provides a weight signal to a microprocessor located in the control module;

wherein the weight signal is indicative of the fact that the car seat is occupied;

wherein the harness lock sensor provides a harness lock signal to the microprocessor located in the control module;

wherein based upon the harness lock signal that it receives, the microprocessor is able to determine that the restraint harness is closed and locked or that the restraint harness has been opened;

wherein the docking sensor provides a docking signal to the microprocessor;

wherein the microprocessor uses the docking signal to determine if the car seat is latched into the docking base;

wherein the microprocessor uses this information to determine whether one or more notification actions and/or one or more remediation actions should be modified or whether they should be invoked at all;

wherein the control module comprises the microprocessor, memory, input/output ports, a sound transducer, a first transceiver, a second transceiver, and one or more batteries;

wherein the control module monitors input signals from the weight sensor, the harness lock sensor, and the docking sensor, detects changes in the state of the car seat or the vehicle, and determines whether or not the alarm condition exists.

2. The baby car seat and dock alarm system according to claim 1, wherein the microprocessor is a processor that executes a control program stored in the memory;

wherein the control program determines the specific sequence of operations that the control module performs and what specific responses to invoke when the alarm condition exists;

wherein the memory is non-volatile memory, volatile memory, or a combination thereof;

wherein the memory holds the control program and/or data used by the control program;

wherein the sound transducer is a device that produces an audible sound when activated by an electrical signal.

3. The baby car seat and dock alarm system according to claim 2, wherein the sound transducer produces one or more monotonic notes and/or is adapted to reproduce a human speech that is encoded in the activation signal.

4. The baby car seat and dock alarm system according to claim 3, wherein the control module further comprises a timer circuit;

wherein the timer circuit allows the microprocessor to measure the passage of time.

5. The baby car seat and dock alarm system according to claim 3, wherein the first transceiver is a device that exchanges wireless signals with the vehicle computer system;

wherein the first transceiver is selected to match frequency, modulation technique, and protocol, of the vehicle computer system.

6. The baby car seat and dock alarm system according to claim 5, wherein the second transceiver is a device that exchanges signals with a smart phone via a cellular telephone network;

wherein using the second transceiver, the control module is able to send a text message to the smart phone, place a call to the smart phone and play audio through the connection, and/or digitally communicate with an application program running on the smart phone.

7. The baby car seat and dock alarm system according to claim 6, wherein the first transceiver and the second transceiver are a single transceiver.

8. The baby car seat and dock alarm system according to claim 6, wherein the alarm condition is detected by analyzing the state of the weight sensor, the state of the harness lock sensor, and the state of the docking sensor.

9. The baby car seat and dock alarm system according to claim 8, wherein the control module acquires the geographic position of the vehicle from the vehicle computer system.

10. The baby car seat and dock alarm system according to claim 8, wherein at least one of the one or more remediation actions requires approval in the form of a message sent by the application program running on the smart phone of a driver before the control module performs the one or more remediation actions.

11. The baby car seat and dock alarm system according to claim 8, wherein the one or more notification actions and the one or more remediation actions each have an alternative action defined within the control module.

* * * * *